United States Patent Office 2,836,631
Patented May 27, 1958

2,836,631

METHODS OF PREPARATION OF CYCLOHEXADIENES

Alfred Viola, College Park, and Gilbert Forrest Woods, Silver Spring, Md., and Nicholas Charles Bolgiano, Pittsburgh, Pa.

No Drawing. Application March 10, 1955
Serial No. 493,577

5 Claims. (Cl. 260—666)

This invention relates to methods of preparation of cyclohexadienes. More particularly, the invention relates to methods of preparation of cyclohexadienes by the cyclization of ene-diols. The invention further relates to the preparation of cyclohexadienes such as dialkylcyclohexadienes, decahydrophenanthrene and the like as exemplified by the following reactions:

(1)
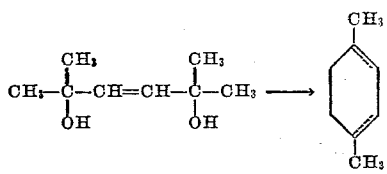

(2)
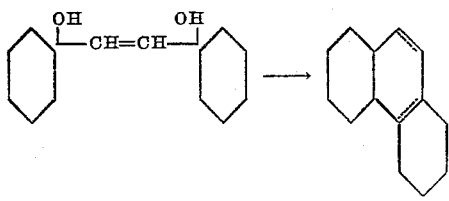

In the two reactions shown above the position of the ethylenic links is immaterial but are illustrated by the dotted lines.

The aforementioned cyclohexadienes may then be readily converted to the corresponding aromatic equivalents, for example, conversion of 1,4-dimethylcyclohexadiene to p-xylene as will be illustrated hereinafter.

The present invention contemplates the cyclization of ene-diols such as dimethylhexene diol and 1,2-di(1-hydroxycycloalkyl)-ethylene, with loss of the elements of water, to substituted cyclohexadienes at elevated temperatures in the presence of catalysts. For convenience, the term cyclization will be construed hereinafter to mean dehydrocyclization (cyclization with loss of water).

Alumina, silica, clays and the like are found to be effective catalysts for the aforementioned cyclization.

Cyclization temperatures for optimum yields range from above 300° C. and greatly improved yields are manifested at temperatures of 400° C. and above.

Without intending to limit the scope of the invention thereto, the invention is illustrated in the following examples:

EXAMPLE I

*Preparation of 1,4-dimethylcyclohexadiene from 2,5-dimethyl-3-hexen-2,5-diol and conversion of this product to p-xylene*

2,5-dimethyl-3-hexen-2,5-diol (64 g.) was passed through a column packed with alumina which was heated to 475–500° C. A nitrogen atmosphere and reduced pressure were used. The product was condensed by means of a Dry Ice-acetone bath. After drying, the product (38 g.) was distilled to yield 1,4-dimethylcyclohexadiene boiling at 128–123° C.; $n_D^{30} = 1.471$. Nine grams of this material was added dropwise to 10% palladium-carbon black heated to 150–200° C. using reflux conditions. After refluxing for ½ to 2 hours all material that would distill was collected. Twice its volume of petroleum ether (30–40°) was added to the distillate and the whole chilled. White crystalline p-xylene was obtained by suction-filtration.

EXAMPLE II

*Preparation of decahydrophenanthrene from 1,2-di-(1-hydroxycyclohexyl)-ethylene*

1,2-di-(1-hydroxyclohexl)-ethylene (70 g.) was passed as a vapor under reduced pressure into a column packed with alumina which was heated to 400° C. The product was dried and distilled in a nitrogen atmosphere to yield 41 g. of a slightly yellow colored, rather viscous oil boiling at 100–110° at 0.2 mm. This material had a typical diene ultraviolet absorption spectrum but upon which was superimposed a slight trienic impurity curve (from 1,2-di-(1-cyclohexenyl)-ethylene).

Addition of this material under reflux conditions in the presence of palidinized charcoal led to the evolution of hydrogen and the formation of phenanthrene which was identical with an authentic sample.

Suitable modifications and variations may be made in the foregoing examples without departing from the scope of the invention, as will be apparent to those skilled in the art.

It is intended that the patent shall cover by suitable expression in the appended claims the features of patentable novelty set forth herein.

We claim:

1. The method of preparation of cyclohexadienes comprising cyclizing, with loss of water, an ene-diol having at least 6 carbon atoms, at a temperature in excess of 300° C. in the vapor phase in the presence of an inorganic solid catalyst.

2. The method of preparation of substituted cyclohexadienes comprising cyclizing, with loss of water, a dialkylhexen diol at a temperature in excess of 300° C. in the vapor phase in the presence of an inorganic solid catalyst.

3. The method of preparation of substituted cyclohexadienes comprising cyclizing, with loss of water, a dimethylhexen diol at a temperature in excess of 300° C. in the vapor phase in the presence of an inorganic solid catalyst.

4. The method of preparation of substituted cyclohexadienes comprising cyclizing with loss of water, a 1,2-di-(1-hydroxycycloalkyl)-ethylene at a temperature in excess of 300° C. in the vapor phase in the presence of an inorganic solid catalyst.

5. The method of preparation of substituted cyclohexadienes comprising cyclizing, with loss of water, 1,2-di-(1-hydroxycyclohexyl)-ethylene at a temperature in excess of 300° C. in the vapor phase in the presence of an inorganic solid catalyst.

References Cited in the file of this patent

UNITED STATES PATENTS

| | | |
|---|---|---|
| 2,406,630 | Pines et al. | Aug. 27, 1946 |
| 2,737,537 | Taylor et al. | Mar. 6, 1956 |

OTHER REFERENCES

Butz et al.: Journal of Organic Chemistry, vol. 5, pages 171–183 (1939); Jour. Am. Chem. Soc., vol. 64, page 1978 (1942).

Olberg et al.: Jour. Am. Chem. Soc., vol. 66, pages 1096–1099 (1944).